United States Patent [19]

Dillingham et al.

[11] 3,903,503

[45] Sept. 2, 1975

[54] METHOD AND MEANS FOR READING NUMERALS

[75] Inventors: Edward Dillingham, Pacific Palisades; Frederick William Schmidt, Placentia, both of Calif.

[73] Assignee: Data Source Corporation, El Segundo, Calif.

[22] Filed: Feb. 25, 1974

[21] Appl. No.: 445,706

Related U.S. Application Data

[63] Continuation of Ser. No. 229,922, Feb. 28, 1972, abandoned.

[52] U.S. Cl. .......................................... 340/146.3 J

[51] Int. Cl.$^2$ .......................................... G06K 9/06

[58] Field of Search. 340/146.3 F, 146.3 J, 146.3 Z, 340/146.3 AC, 146.3 WD, 146.3 MA, 146.3 R

[56] References Cited

UNITED STATES PATENTS

| | | | |
|---|---|---|---|
| 3,140,466 | 7/1964 | Greanias et al. | 340/146.3 AC |
| 3,531,770 | 9/1970 | Mauch et al. | 340/146.3 F |
| 3,671,717 | 6/1972 | Bieser | 340/146.3 Z |
| 3,710,319 | 1/1973 | Miller et al. | 340/146.3 J |
| 3,714,630 | 1/1973 | Cribbs | 340/146.3 J |
| 3,714,631 | 1/1973 | Deschenes | 340/146.3 WD |
| 3,772,648 | 11/1973 | Schlang | 340/146.3 J |
| 3,800,282 | 3/1974 | Acker | 340/146.3 Z |

*Primary Examiner*—Leo H. Boudreau
*Attorney, Agent, or Firm*—Seidel, Gonda & Goldhammer

[57] ABSTRACT

Numerals of a font having a unique combination of horizontal and vertical bars are identified using a plurality of spatially displaced detectors that sample different horizontal regions of a character as the latter is horizontally scanned by the detectors. At the instant a bar of the character being scanned is opposite a detector, an event is said to occur in the signal derived from the detector. Such event is manifested by a predetermined amplitude of the signal. Logic means responsive to the occurrence of events in the signals produces an indication of the bars present in the character being scanned, thereby permitting it to be identified during the scanning process.

22 Claims, 8 Drawing Figures

METHOD AND MEANS FOR READING NUMERALS

This is a continuation of application Ser. No. 229,922, filed Feb. 28, 1972, now abandoned.

This invention relates to a method and means for reading numerals made up of unique combination of horizontal and vertical bars.

Identification indicia provided for credit cards, passbooks, product tags, labels, etc. must be in a format that is readable by both human observers and machines. One approach to this problem, where numerals are concerned, is to employ a font made up of seven basic bars, three of which are horizontal (top, middle, and bottom) and four which are vertical (top-left, top-right, bottom-left, and bottom right).

A character wherein all seven basic bars are present is in the shape of the numeral "8"; an observer inspecting such a character would visually interpret the character as the numeral 8. The numerals "0" through "9" are each made up of unique combinations of the seven bars of the font arranged in the shape of the numeral in question, and are readily identifiable by an observer.

In an electronic character recognition system, it will be possible to identify a character being scanned if it is possible to establish which of the seven basic bars are present in the character. Thus, if the scanned character is found to have all seven bars present, it may be concluded properly that the character is the numeral 8. If the scanned character, on the other hand, is found to have all bars present but the middle horizontal bar, it may be concluded properly that the character being scanned is the numeral 0.

The numerals 1 and 4 are special cases, because for ease of reading by an observer the vertical bars of 1 and the top right and bottom right vertical bars of 4 are displaced toward the center of the character. The present invention records these bars as though they were at the righthand position, special provisions being made to accomplish this.

The primary object of the present invention is to provide a novel method and means by which numerals, made up of unique combinations of horizontal and vertical bars can be read and identified. A second object is to adapt said means to read and identify characters of a standard and widely used embossing font. A third object is to make said means independent of the means by which scanning of the characters is accomplished, and especially of the speed at which scanning is performed. A fourth object is to make said means insensitive to some of the commonly occurring non-ideal conditions encountered in embossed credit cards.

Briefly, the invention utilzes a scan head provided with a plurality of spatially displaced detectors, each of whose field of view is restricted to a different horizontal band of the character being scanned. At the instant a bar of the character being scanned is opposite a detector, an event is said to occur at that instant in the signal derived from the detector. Such event is manifested by a predetermined amplitude of the signal. Whether events occur in the signals at a given instant during the scanning of a character depends upon the identity of the character being scanned and the relative location between the character and the scan head at that instant. The detector signals are logically combined in a manner dependent on the sequence of events occurring in the signals to provide an indication of which of the basic bars are present in the character being scanned. A predetermined sequential occurrence of certain events causes a strobe pulse to be produced indicating that the bars identified as of the time of the strobe pulse are sufficient to identify the character being scanned.

The features of this invention for which protection is sought are pointed out with particularity in the appended claims.

The invention itself, however, both as to its organization and method of organization, together with further objects and advantages thereof, may best be understood by reference to the following description taken in connection with the accompanying drawing, wherein like parts in each of the several figures are identified by the same reference character, and wherein.

Figures 1, 2, 3, 4, 5:
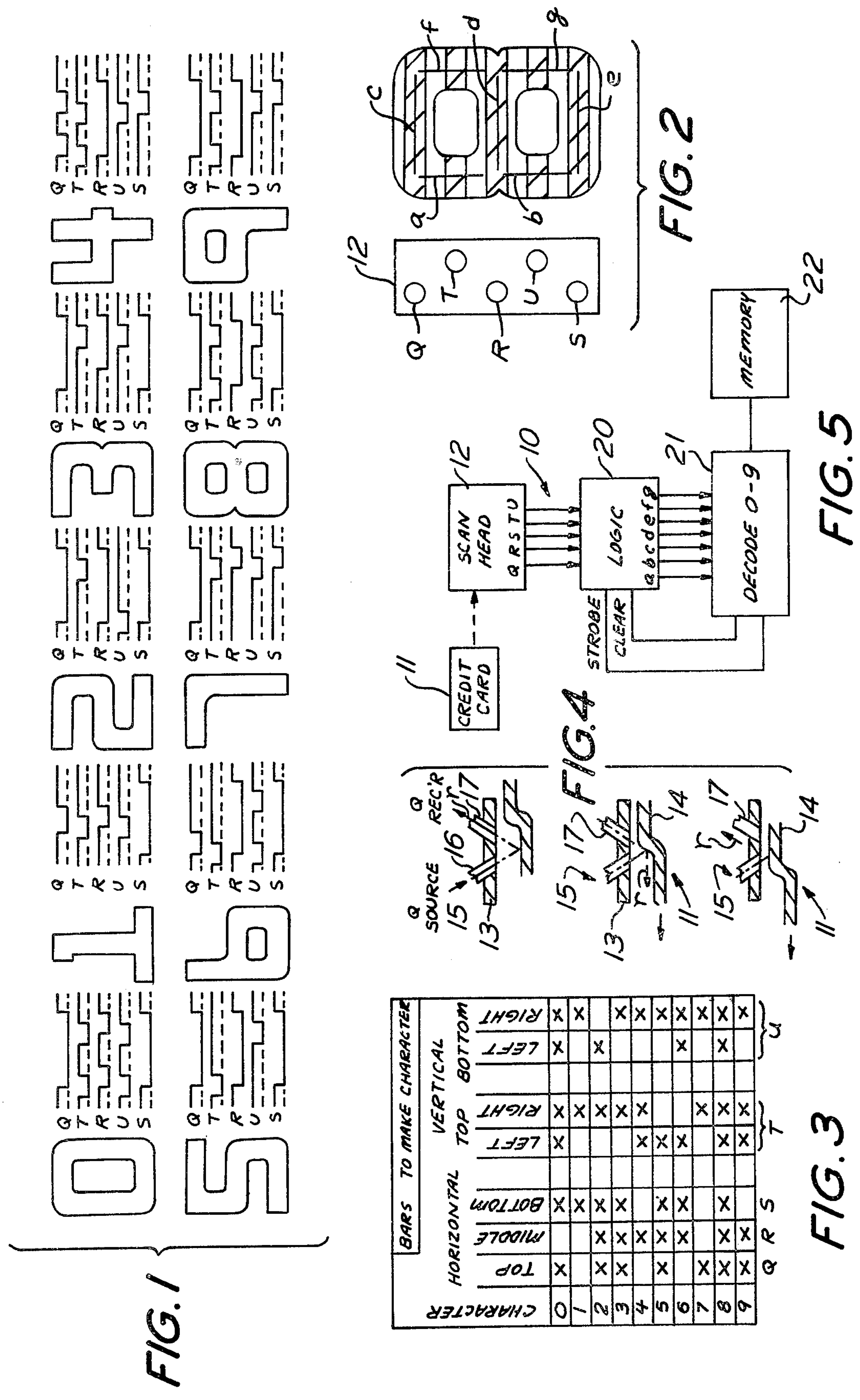
FIG. 1 shows a font of numerals made up of spatially oriented bars, and showing the signals developed as a result of the scanning of the numerals using the spatially displaced detectors of FIG. 2.
FIG. 2 shows the scanning head of the present invention associated with the numeral of the font which includes all of the seven basic bars by which the numerals are constructed.
FIG. 3 is a chart showing which of the seven basic bars is necessary to establish the ten numerals of the font.
FIG. 4 illustrates the sequential scanning of a surface by a detector.
FIG. 5 is a block diagram of an electronic character recognition system made in accordance with the present invention.

Referring now to FIG. 1, the ten numerals shown therein are typical of numerals embossed, debossed or printed upon credit cards, product tags and labels, or passbooks for the purpose of customer or product identification. The format of these numerals makes them easily readable by human observers. The format is also readable by device 10 shown in FIG. 5, to which reference is now made.

An object carrying the numerals to be identified is indicated generally by credit card 11 which may be mounted in a conventional device (not shown) for scanning by scan head 12. The scanning device must provide for aligning the scan head 12 with the numerals to be identified. Because the present invention is not dependent upon speed, nor upon any external information about timing or position along the scan path, the scanning device may be operated by motors, by springs, or by hand, and it has no electrical connections to the reading means except for a switch to indicate when scanning is being performed.

The numerals on credit card 11 are usually embossed or debossed, permitting an optical detector in the scan head to detect the presence or absence of a character opposite the detectors. Reference is now made to FIG. 4 which shows a small section of credit card 11 as it is traversed past a detector station 13. Card 11 is essentially planar but is provided with a raised region 14 in the shape of a numeral. In the event the credit card is of the debossed type, a depression in the form of a numeral is provided in the planar surface of the credit card.

The detector shown in FIG. 4 comprises a miniature light source 15 which directs a beam of light at an acute angle to the planar surface of credit card 11 through the use of fiber-optics 16. Light from source 16 impinging upon the planar surface of card 11 is reflected by the surface into fiber-optics 17 with which a photodetector is associated as indicated by ray *r*. As the scanning process continues and credit card 11 moves relative to station 13, raised portion 14 will intercept light projected by optics 16, thus diverting ray *r* from the input to optics 17. The photodetector associated with optics 17 will respond in a conventional manner to a reduction in light input providing an indication that a portion of a character is opposite the detector. Further movement of credit card 11 past station 13 will place raised region 14 opposite optics 16. Since the surface of raised portion 14 will be closer to station 13 than the planar region of credit card 11, light from optics 16 will be reflected out of range of receiving optics 17 as indicated by ray *r* with the result that the photodetector associated with optics 17 will remain dark until the raised portion is no longer opposite optics 16.

The system shown in FIG. 4 is also suitable for reading indicia printed on credit card 11 with ink. In such case, the change in reflectivity on the surface of the credit card occasioned by the appearance of a portion of a numeral opposite the detector station will be responded to by the photodetector associated with the optics 17 in the same manner as previously described.

Scan head 12 shown in FIG. 2 comprises two sets of horizontally displaced detectors of the type shown in FIG. 4. The first set of detector comprises three vertically aligned detectors identified as Q, R and S establishing what is termed to be Q, R and S channels of the head. The second set of detectors comprises two vertically aligned detectors identified as T and U establishing what is termed the T and U channels of the head. Detectors Q, R and S are aligned, respectively, with the top, middle, and bottom horizontal bars of the font being used. This is illustrated in FIG. 2 by the numeral 8 positioned to the right of scan head 12. This numeral contains all seven of the basic bars of the font. In particular, detector Q is aligned with top horizontal bar "*c*"; detector R is aligned with middle horizontal bar "*d*"; and detector S is aligned with the bottom horizontal bar "*e*". Relative movement between the scan head 12 and a numeral to be identified will cause the detectors of the first set to scan the area of a numeral covered by the cross-hatched portion of numeral 8 enclosing *c*, *d* and *e*, as shown in FIG. 2.

Detector T is located approximately midway between detectors Q and R; and detector U is located approximately midway between detectors R and S. As a consequence of this arrangement, detectors T and U will scan along the cross-hatched regions of a numeral intercepting bars *a*, *b*, *f* and *g*, as indicated in FIG. 2. The horizontal spacing between the two sets of detectors is such that detector T or U will always detect the presence of a vertical bar before detector Q, R or S detects that bar, but detector Q, R or S will detect a leading horizontal bar, as in 1, 3 or 7 before T or U detects a vertical bar. Because the right vertical bars of 1 are displaced toward the left, this requires a close spacing between detector "S" and detectors T and U; said spacing being somewhat smaller than the distance by which the bottom bar of the 1 projects to the left of its vertical bars. A similar but less critical requirement exists for detector R because of the shortened middle horizontal bar of 3. The placement of detector Q is dictated by 4 because detector Q is affected by the top left and top right vertical bars of 4 and only briefly detects the absence of a top horizontal bar. This detection must occur while detectors T and U are detecting the presence of the top and bottom right vertical bars.

Although the characters shown in FIG. 1 have vertical side bars, and therefore the Q, R and S detectors are shown as being aligned in one vertical plane and the T and U detectors as being aligned in a second vertical plane, the character recognition system will function in the same way if the characters of the font have slanted or sloped side bars instead of vertical ones and the detectors are aligned so that the Q, R and S detector lie on a first line or plane substantial parallel to the slanted bars of the characters and the T and U detectors lie on a second line or plane substantially parallel to the slanted side bars of the characters to be read. Hence, while reference is made herein to vertical bars as a specific example to aid in understanding, the term vertical bars is not intended to be limiting and is meant to include bars which are slanted or sloped as well.

Whenever no bar of a character is opposite a detector, the amplitude of the signal in the channel associated with the detector will have a first level, in this case approximately plus five volts. when a bar of a character is opposite a detector, the signal level in the channel will be different; in this case, approximately 0 volts. The signal level at any instant in a channel is therefore an indication of whether a bar of the character being scanned is opposite the detector at that instant. If a bar is opposite, this situation is termed "an event". The present invention utilizes a dynamic scanning system in which a predetermined sequence of events in the various channels is utilized to establish which of the seven basic bars of the font is present in the character being scanned, and to indicate when, during the scanning process, sufficient informtion is available to be assured that the character being scanned can be properly identified.

Referring again to FIG. 1, the signal levels in each of the five channels are shown for a time-window encompassing the scanning of the character in question by the scanning head 12. The time scale runs from left to right in FIG. 1, and the broken line in each channel represents a potential of about 0 volts. To achieve the signal levels shown, the direction of scanniing is such that a character being scanned encounters the second set of detectors T, U before encountering the first set of detectors Q, R and S. In other words, as seen in FIG. 2, the direction of relative movement between the character and the scanning head is such that the character moves from the right in FIG. 2 to the left.

From a comparison of the signal levels associated with each of the ten numerals, with the information contained in FIG. 3, five important conclusions can be drawn: (1) An event in the T or U channels occurring prior to an event in any of the Q, R or S channels is indicative of the presence of left vertical bars in the character being scanned. If an event occurs in the T channel, the character being scanned has a top left vertical bar *a;* and if an event occurs in the U channel, the character being scanned has a bottom left vertical bar *b*. (2) After the occurrance of an event in any of the Q, R or S channels, the subsequent occurrence of an event in either of the T or U channels indicates that the character being scanned has right vertical bars. If an event occurs in the T channel under these circumstances, the character being scanned has a top right vertical bar *f*; while if an event occurs in the U channel, the character being scanned has a bottom right vertical bar *g*. (3) When an event occurs in the T or U channel subsequent to the occurrence of an event in any of the Q, R or S channels, the simultaneous occurrence of an event in the Q channel is indicative of the presence of a top horizontal bar *c* in the character being scanned; the simultaneous occurrence of an event in the R channel is indicative of the presence of the middle horizontal bar *d* in the character being scanned; and the occurrence of an event in the S channel is indicative of the presence of a bottom horizontal bar *e* in the character being scanned. (4) All of the information necessary to determine which of the seven possible bars is present in a character being scanned becomes known after the occurrence of the last event in the T or U channels; which event occurs subsequent to an event in any of the Q, R or S channels. (5) The scanning of a character is complete upon the termination of the last event in each of the Q, R and S channels.

To illustrate the applicability of the above described rules, attention is directed to the signals derived as a consequence of the scanning of the numeral 0. As shown in FIG. 1, an event occurs in each of the T and U channels before an event occurs in any of the Q, R or S channels. This situation arises because the second set of detectors T, U encounters the leading edge of the number 0 as it is being scanned before the leading edge is encountered by detectors Q, R and S. When the leading edge of the scanned character reaches detectors Q, R and S, each of these detectors will begin to indicate the occurrence of an event in each channel. In accordance with rule (1), the events in the T and U channels indicate that the character being scanned has a top left vertical bar *a* and a bottom left vertical bar *b*.

In accordance with rule (2), the occurrence of events in the T and U channels after the occurrence of events in the Q, R and S channels indicate that the character being scanned has a top right vertical bar *f* and a bottom right vertical bar *g*. In accordance with rule (3), the occurrence of events in the Q and S channels simultaneously with the occurrence of events in the T and U channels indicate that the character being scanned has an upper horizontal bar *c* and a lower horizontal bar *e*. The absence of an event in the R channel at this time indicates the absence of a middle horizontal bar *d* in the character being scanned. At the conclusion of the events of the T and U channel, it is clear that there has been an ascertainment that the character being scanned has all of the basic bars except one, namely the center horizontal bar *d*. At this time, therefore, rule (4) states that there is sufficient information to identify the character being scanned. In accordance with rule (5), scanning of a character is complete at the conclusion of the events in the Q, R and S channels.

The logic described above can be traced for each of the nine other numerals; and in each case the results is an indicated in the chart of FIG. 3. As to the numeral 1 the rules specified above yield the result that the character 1 has a bottom horizontal bar, a top right vertical bar, and a bottom right vertical bar. Visually, this is slightly different from the original character, whose vertical bar is in the center, but this circumstance is of no import in the present situation because the bars corresponding to numeral 1 have a unique arrangement with respect to the other nine arrangements of the bars.

An electronic character recognition system to carry out the method indicated by the five rules described above, is shown in block diagram form in FIG. 5 to which reference is now made. Credit card 11 carries a series of numerals that are embossed, debossed or printed in ink on the surface of the credit card. In order to recognize these numerals, credit card 11 and scan head 12 are caused to move linearly relative to each other by a conventional mechanism, not shown. As a consequence, the numerals on credit card 11 are caused to be sequentially swept past scanning head 12. The signals appearing at the channels Q, R, S, T and U will have the form shown in FIG. 1 depending upon the particular numeral being scanned. The five channels are applied to logic circuit 20 incorporating means to apply the five rules described above. The output of logic means 20 is constituted by seven channels identified as *a*, *b*, *c*, *d*, *e*, *f*, and *g*. The voltage level appearing in these last mentioned channels determines whether a bar of the font is present in the character being scanned. For example, the presence of a voltage level of 5 volts at channel *a* indicates that the character being scanned has a top left vertical bar.

Decoding of the voltages levels appearing in the seven channeled output of logic means 20 is achieved by conventional decoding means 21. For example, an AND-gate may be associated with each character to be identified. When a strobe pulse generated by logic means 20 in accordance with rule (4) is applied to each AND-gate in the decode means 21, an output recognition pulse will occur at the AND-gate corresponding to the character being scanned. This character recognition pulse may be used to set a flip-flop in decode means 21 temporarily storing the identity of the character being scanned so that the appearance of the "clear" pulse generated in accordance with rule (5) by logic means 20 can be used to transfer the identity of the character being scanned from decode means 21 into memory means 22 for later use. The above described system will permit all the numerals on credit card 11 to be sequentially identified and transferred to memory means 22. Upon completion of the scanning of all of the numerals on credit card 11, the identity of the numerals on the credit card will be contained in memory means 22. For credit card verification systems, the number contained in memory means 22 may be compared with a series of numbers representing expired credit cards or credit cards which should not be honored.

Alternately, the raw data from logic 20 or the decoded data from decoder 21 may be transmitted to a remote computer which can perform the decoding, memory and comparison functions.

DEFINITIONS OF LOGIC ELEMENTS

Figure 6:
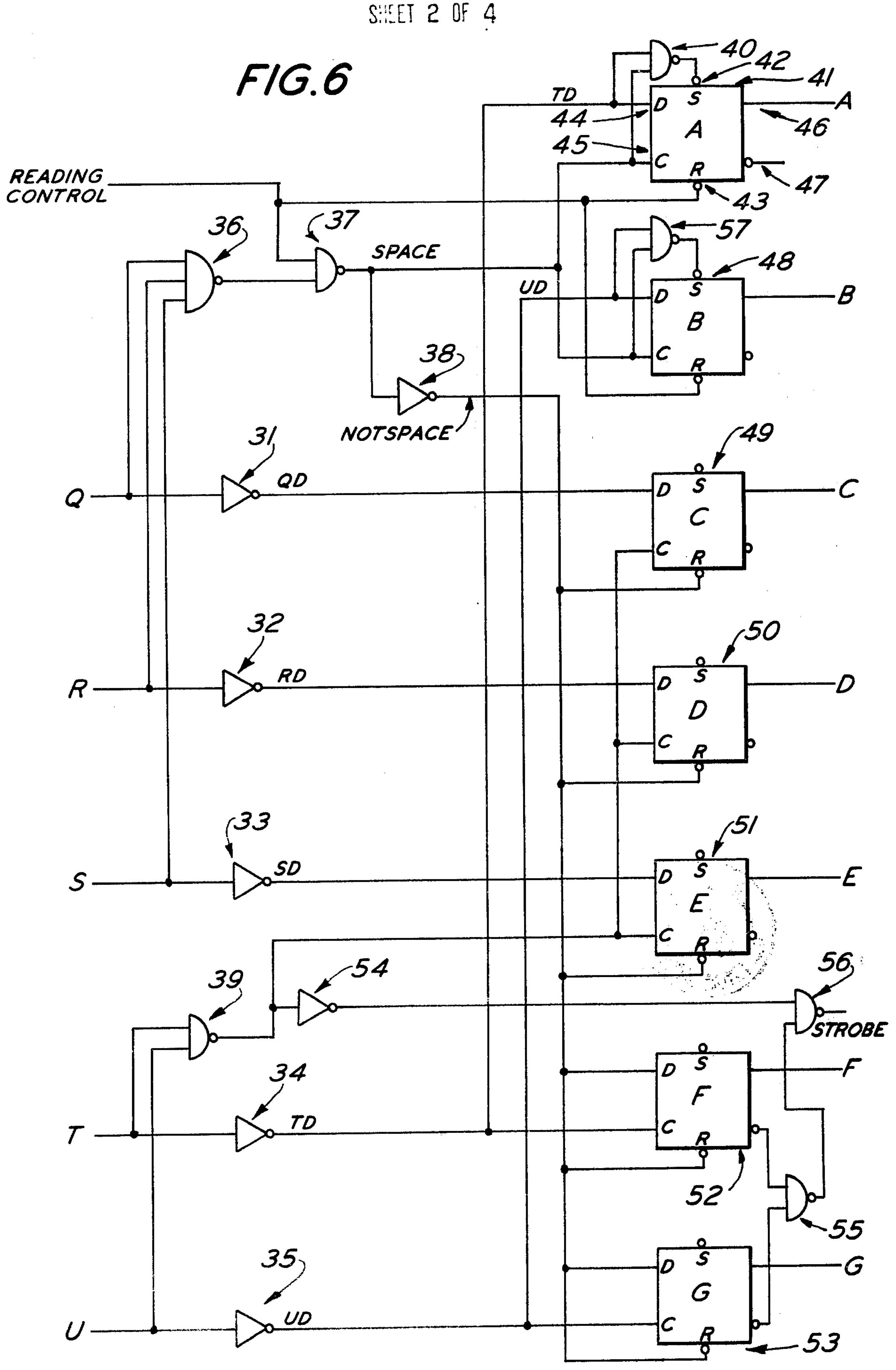
FIG. 6 is a circuit diagram showing details of the logic of the character recognition system.

Details of the logic means 20 are shown in FIG. 6 to which reference is now made. The logic elements in means 20 are of three main types: inverters designated by triangles such as 31; Nand gates designated by semicircles such as 36 and 37; and flip flops designated by rectangles such as 41. Two logic levels exist: a "high" state, approximately +5 volts, and a "low" state, approximately 0 volts. Flow of logic signals is generally from left to right in FIG. 6, so that lines entering logic elements from the left are inputs and lines leaving logic elements from the right are outputs. If an inverter's input is low, its output is high; if its input is high, its output is low. A Nand gate combines an inverting function and a gating function: if all of its inputs are high, its output is low; if any of its inputs are low, its output is high. Both two and three input Nand gates are used. The flip flop used is a D-type edge triggered flip flop. The operation of the flip flop is described with reference to flip flop 41 in FIG. 6. It has an independent, inverted Set input 42; a low signal applied here will cause the output 46 to become high, which is designated the Set condition. Flip flop 41 also has an independent, inverted Reset input 43; a low signal applied here will cause the output 46 to become low, which is designated the Reset condition. If either of these inputs is low, it controls the flip flop independently of the clock input 45 and the Data input 44. High signals at the Set and Reset inputs are ignored, permitting control through the Clock and Data inputs 45 and 44, respectively. When Clock input 45 changes from low to high, the flip flop receives and stores the state of the Data input 44. That is, if the Data input 44 is high during the rising edge of the Clock input 45, the flip flop becomes set and its output 46 becomes high. If the Data input 44 is low during the rising edge of the Clock input 45, the flip flop becomes reset and its output 46 becomes low.

In addition to its nominal output 46, the flip flop has a complementary output 47. When output 46 is high, complementary output 47 is low, and vice versa. When the term "output" is used herein, it is understood to designate the nominal output except if the complementary output is specifically stated.

For convenience, flip flop 41 is also designated flip flop A, referring to the fact that it receives and stores data indicating the presence or absence of bar *a* in the character being scanned. Similarly, flip flops 48 through 53 are designated B, C, D, E, F and G respectively because their states indicate the presence or absence of bars *b, c, d, e, f* and *g* respectively.

These logic elements are standard commercially available components of Transistor-Transistor Logic, and are used here in conventional manner.

FIG. 6 shows that each of the inputs from the reading sensors Q, R, S, T and U enters one inverter and one Nand gate. The inputs are high when the corresponding sensors receive light in the absence of a bar of the character being read, because of the design of the read amplifier associated with the fiber optics and photodetector. The inputs are low when the corresponding sensors do not receive light during the time that a bar is being observed. The inverters 31 through 35 produce opposite outputs, designated respectively QD, RD, SD, TD and UD to indicate that these signals are high when the corresponding sensors are dark. The Nand gates 36 and 39 combine the input signals for specific purposes described below.

An additional signal to logic means 20 is derived from a switch associated with the conventional scanning device (not shown). This signal is low before scanning starts, becomes high when scanning starts, and becomes low again at the completion of scanning. It is used to ensure that any extraneous events occurring before or after scanning are ignored.

CONDITIONS PRIOR TO START OF SCAN

Reading Control signal is low, providing direct Reset inputs to flip flops A and B. It also forces gate 37 output to be high and inverter 38 output to be low. This provides direct Reset inputs to flip flops C, D, E, F and G. Therefore, all flip flops are in the reset state with their outputs low. When scanning starts the Reading Control signal becomes high, releasing the Reset inputs of flip flops A and B and giving control of gate 37 to its other input from gate 36.

At the start of scanning, the Scan Head 12 has not yet reached a character, so all sensors receive light and their inputs to logic means 20 are high.

DURING SCAN: SPACE AND NOTSPACE

When sensors Q, R and S all receive light as they see the space before or between characters, their inputs to the logic are high. This causes the output of NAND gate 36 to be low, which in turn causes the output of Nand gate 37 to be high and the output of Inverter 38 to be low. Reading Control is high throughout the period that reading is performed, so during that time gate 37 and inverter 38 respond to gate 36. For convenience, the output of gate 37 is referred to as Space and the output of inverter 38 is referred to as Notspace. In summary, Space is high when sensors Q, R and S all receive light between characters or when Reading Control is low; it is low when any of Q, R or S sees a bar of a character during the reading period. Notspace is high when any of Q, R or S sees a bar and is low when all of Q, R and S receive lighht between characters or when Reading Control is low.

FLIP FLOPS A AND B

When Q, R and S are all seeing the space between charactes, the signal Space is high. If T sees left top bar of the next character during this time, its inversion TD becomes high. Nand gate 40, therefore, becomes low and sets flip flop A through its Set input 42. When any of Q, R or S sees a horizontal bar of the character, Space becomes low, makin Nand gate 40 high so that subsequent changes of T cannot change flip flop A through its Set input. Space also provides the clock input 45 to flip flop A, and since it remains low until after the character has been read and output, flip flop A cannot be changed through its Data input 44. Ultimately, after the character has been read and output, Space again becomes high. If at this time T is seeing the space between characters so that TD provides a low input to the Data input 44 of flip flop A, the rising edge of Space entering the Clock input 45 causes flip flop A to reset. Alternately, T may already be seeing the left top bar of the succeeding character by this time, in which case the Data and Set inputs of flip flop A both set the flip flop simultaneously. Therefore, flip flop A is set if an only if sensor T has observed a top left bar while Q, R and S are all seeing the space between characters, in accordance with rule 1.

Flip Flop B is controlled by Space and sensor U in exactly the same manner, so that it is set if and only if sensor U has observed a bottom left bar in accordance with rule 1.

FLIP FLOPS C, D AND E

When Q, R and s are all seeing the space between characters, Space is high and its inversion Notspace is low. This signal provides Reset inputs to flip flops C, D, E, F and G, ensuring that they are reset and ready to receive data from the next character. When any of Q, R or S sees a horizontal bar of a character, Space becomes low, Notspace becomes high, and the Reset inputs of these flip flops are released. The set inputs of flip flops C, D, E, F and G are not used; these are set only through their Data and Clock inputs.

Let us consider the operation of flip flop D, which records the presence or absence of a center horizontal bar as observed by sensor R. Having been reset as described above, flip flop D receives its Data input from RD, the inversion of sensor R. When either T or U becomes dark, Nand gate 39 becomes high. The leading edge of this change entering the clock input of flip flop D causes it to receive and store the condition of signal RD at that instant. Thus, if R sees a horizontal bar, RD gives a high signal at the Data input and flip flop D becomes set. In the absence of a bar RD gives a low signal to the Data input and flip flop D remains reset. This state is retained until after the character has been completely read and output. This fulfills rule 3.

Flip flop C responds to sensor Q and flip flop E responds to sensor S in exactly the same manner, so that flip flop C is set if and only if sensor Q sees a top horizontal bar at the instant that sensor T or sensor U sees a right vertical bar, and flip flop E is set if and only if sensor S sees a bottom horizontal bar at that instant.

FLIP FLOPS F AND G

Let us now consider the operation of flip flop F, which records the presence or absence of a top right vertical bar as observed by sensor T. Flip flop F receives its Clock input from TD, the inversion of sensor T. Each time that T becomes dark upon seeing a vertical bar, the rising edge of signal TD provides a clock to flip flop F. During the space between characters, the signal Notspace provides a low input to both the Data and Reset inputs of flip flop F, so F is and remains reset. When any of sensors Q, R or S sees a horizontal bar, Notspace becomes high, releasing the Reset input of flip flop F and providing a high signal to its Data input. Then if sensor T sees a top right vertical bar. Signal TD becomes high and its leading edge provides a Clock input to flip flop F, causing the flip flop to set. Thus, flip flop F is set if and only if sensor T sees a top right vertical bar while at least one of sensors Q, R or S is seeing a horizontal bar, fulfilling rule 2.

Flip flop G is controlled by Notspace and sensor U in exactly the same manner, so that it is set if and only if sensor U sees a bottom right vertical bar while at least one of sensors Q, R or S is seeing a horizontal bar, fulfilling rule 2.

STROBE

Whenever either T or U becomes dark, gate 39 output becomes high, forcing the output of inverter 54 to become low. When both T and U are light, inverter 54 output becomes high. This change occurs both at the trailing edge of left vertical bars (if they exist) and at the trailing edge of right vertical bars.

Nand gate 55 has as its inputs the complementary outputs of flip flops F and G. These flip flops are reset by Notspace at the end of each character, and cannot be set by left vertical bars, as explained above. Therefore, during and immediately after the left vertical bars are sensed, these complementary outputs are high, gate 55 output is low, so Nand gate 56 output remains high despite the change of inverter 54 output during the left vertical bars.

Each of the characters which this invention seeks to read has at least one right vertical bar, the vertical of the numeral 1 being treated as though it were at the right. Therefore at least one of the flip flops F or G will be set at the leading edge of the corresponding right vertical bar, so at least one of the inputs of gate 55 will become low and its output will be high. At this time, however, because of the presence of the right vertical bar, gate 39 output will be high and inverter 54 will be low. Therefore the output gate 56 remains high at this time.

When sensors T and U have both passed the character being scanned and see reflection, inputs T and U both become high, gate 39 becomes low, and inverter 54 becomes high. Now gate 55 is still high because F or G is still set; both inputs to gate 56 are high, and the output of gate 56 becomes low. It remains low until F and G are reset by Notspace becoming low when sensor Q, R and S all see the space after the character. This low signal, enduring from the time that sensor T and U leave the character until sensors Q, R and S leave the character, is designated "Strobe". Its falling edge coincides with the fulfillment of rule 4, all of the data from the character being scanned then being present in flip flop A through G. Its rising edge coincides with the fulfillment of rule 5, scanning of the character then being complete and the flip flops then being reset by the occurrence of Space.

EXAMPLE OF A CHARACTER SCAN

Figure 7:
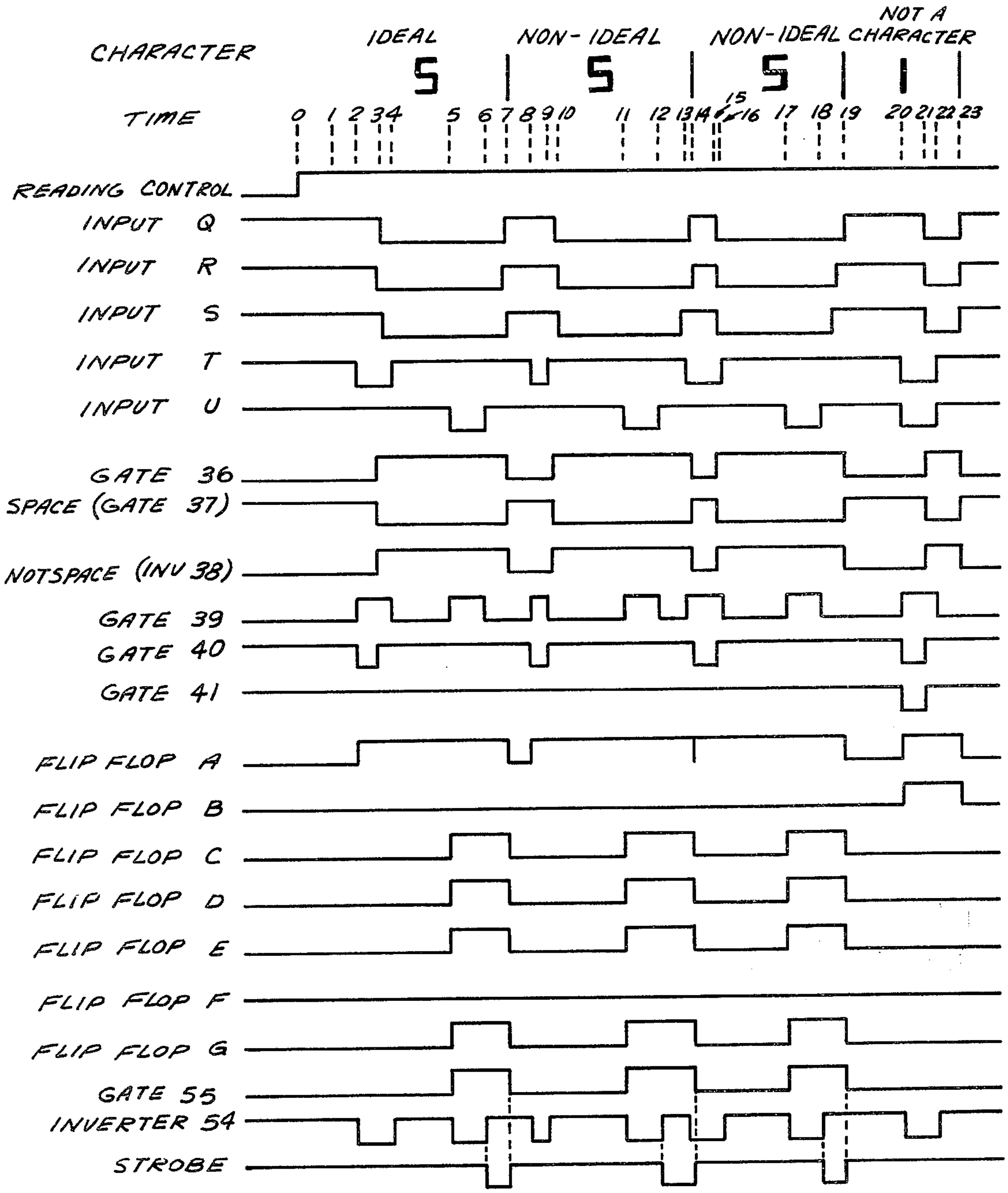
FIG. 7 is a timing diagram for many of the signals generated and used in the logic of FIG. 6.

Operation of a logic means 20 may be further clarified by an example of the scanning of a character. The numeral 5 provides a good example. Reference is now made to FIG. 7, the timing diagram.

Before the read head reaches the character all sensors see light so all inputs are high (time 1 in FIG. 7).

Gate 36 output is low; gate 37 (Space) output is high, inverter 38 (Notspace) output is low; thus resetting flip flops C through G. Inverters 34 and 35 (TD and UD) are low and were already low when Space became high, thus resetting flip flops A and B. Because flip flops F and G are reset, their complementary outputs are high, gate 55 is low, and gate 56 (Strobe) is high.

Sensor T sees the top left vertical bar of the 5 and input T becomes low (time 2), so TD becomes high. Space is high, so gate 40 becomes low and sets flip flop A. When input T becomes low gate 39 output becomes high, inverter 54 output becomes low. This has no effect on gate 56, whose output is already high.

Sensor U continues to see light, there being no left bottom vertical bar. Therefore, input U remains high, UD remains low, gate 57 remains high, so flip flop B remains reset.

At time 3, sensors Q, R and S all see the horizontal bars. The exact sequence is insignificant. When the first of them becomes dark gate 36 output becomes high, Space becomes low, and Notspace becomes high, releasing the Reset inputs of flip flops C through G and providing high Data inputs to flip flops F and G. No changes in flip flop states occur at this time because all clock inputs are low.

At time 4, sensor T leaves the top left bar and input T becomes high. TD becomes low, gate 40 becomes high, releasing the Set input of flip flop A but not changing its state. The falling edge of TD has no effect at the Clock input of flip flop F. Similarly, gate 39 output becomes low but this falling edge has no effect on flip flops C, D and E. Inverter 54 becomes high, but since gate 55 output is still low there is no effect on gate 56 output. In summary, no flip flop changes state and the Strobe output does not change at this time.

At time 5, sensor U sees the bottom right vertical bar of the 5 and input U becomes low. UD becomes high, providing a rising edge clock input to flip flop G. Since its Data input is high (Notspace) this sets flip flop G. When U becomes low, gate 39 output becomes high, providing a rising edge Clock input to flip flops C, D and E. Since the sensor inputs Q, R and S are all low, QD, RD and SD provide high Data inputs to flip flops C, D and E, setting all of them.

Input T remains high, since no top right vertical exists, and flip flop F remains reset.

At time 6, sensor U passes the bottom right vertical bar and sees light. Input U becomes high, gate 39 becomes low, and inverter 54 becomes high. Since flip flop G has been set, its complementary output is low making gate 55 output high. Thus, both inputs to gate 56 are high and its output, Strobe becomes low. At this time, flip flop A is still set, B is still reset, C, D, and E are all set, F is still reset, and G is set. Their outputs correspond to the presence or absence of bars in positions *a*, *b*, *c*, *d*, *e*, *f* and *g*.

Finally, at time 7, sensors Q, R and S all leave the character and their inputs become high. The exact sequence is insignificant. When the last of these inputs becomes high, gate 36 output becomes low and Space (gate 37) becomes high. This provides a rising edge Clock input to flip flops A and B. Since TD and UD are both low these flip flops are reset. At the same time Notspace (inverter 38) becomes low providing direct reset inputs to flip flops C through G. As flip flop G is reset its complementary output becomes high, gate 55, becomes low, and gate 56 becomes high, terminating the low output Strobe.

NON-IDEAL CONDITIONS

The example preceding assumed an ideal scanning situation. Let us now consider some departures from the ideal.

First, it is possible that the dark period for sensor T or U will be very brief, so that it sees light (time 9) after the bar before Q, R or S becomes dark at the beginning of the character (time 10). As in the preceding example, input T becomes low and TD becomes high while Space is high, so gate 40 becomes low and sets flip flop A. Now even though input T becomes high again before Space becomes low flip flop A remains set. As in the preceding example no flip flops change state when input T becomes high and when space becomes low. Therefore, the logic is insensitive to the width of the signal.

Second, it is possible that the light period for sensors T and U between characters will be very brief, so that one or both will start to see a succeeding character (time 13) before Space becomes high (time 14). Provided that Space becomes high between characters (time 14) while T (or U) is still dark so that TD (or UD) is still high, gate 40 (or 57) will become low as soon as the space is seen by Q, R and S, and flip flop A (or B) will be will be set at time 14 both by its Clock and Data inputs and its direct Set input, or as in this example, it will remain in its previous set condition. Therefore the logic is insensitive to the length of the space between characters.

Third, if a solid bar or dark area is sensed, as it might be as a result of printed information or borders on a card, flip flops A and B will be set as above (time 20). Subsequently sensors Q, R and S will see the dark area. Signals TD and UD and gate 39 have become high before Notspace becomes low; and they become low when sensors T and U leave the dark area; but they do not become high again while sensors Q, R and S are seeing the dark area. Therefore no rising edge clock is provided to flip flops C, D, E, F or G, they are not set, and no Strobe output is produced. When Q, R and S pass the dark area the rising edge of Space provides Clock inputs to flip flops A and B. Their Data inputs TD and UD are low, so the flip flops are reset. Therefore the logic discriminates against solid dark areas.

MODIFIED LOGIC

Figure 8:
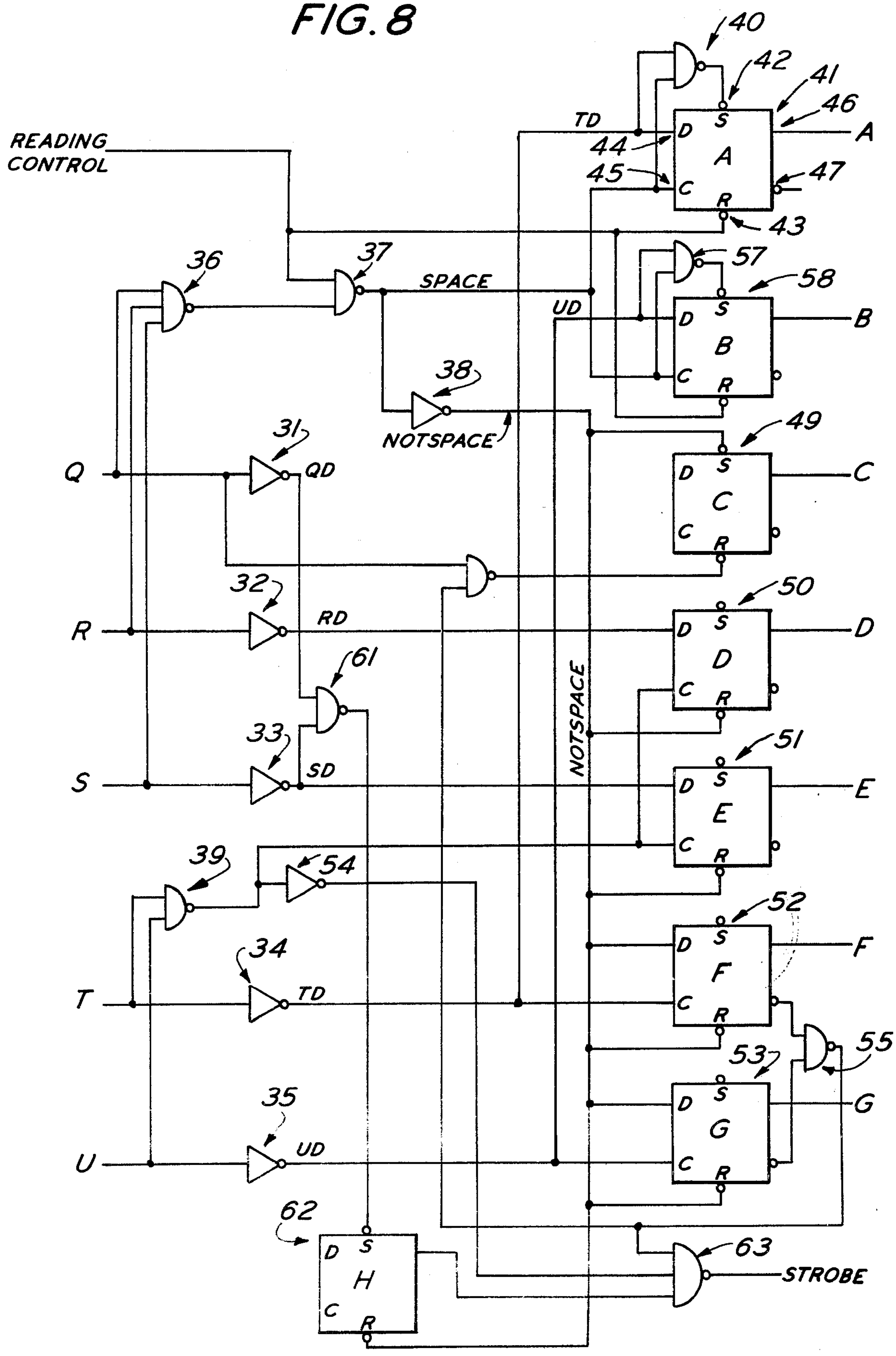
FIG. 8 is a circuit diagram of a modified version of the logic of FIG. 6.

Two additional non-ideal conditions can exist. Modified logic which retains all of the functions of that described above and also copes with these additional conditions at the cost of slightly increased complexity is shown in FIG. 8. This logic is identical to FIG. 6 with the following exceptions: flip flop C is set instead of reset by Notspace; Nand gate 60 is added to reset flip flop C; the Data and Clock inputs of flip flop C are not used; flip flop 62 (designated H for convenience) is added; Nand gate 61 is added to set flip flop H; and the two input Nand gate 56 is replaced by the three Nand gate 63. The reasons for these changes are described below.

As mentioned previously, the right vertical bars of the numeral 4 are displaced toward the center of the character. This gives a narrower space between the top left and the right vertical bars than occurs in other characters. Therefore under non-ideal conditions sensors T and U may see the right vertical bars while sensor Q is still seeing the left vertical bar. In the standard logic this results in flip flop C being set when gate 39 output becomes high since QD is still high. The character 4 has then been mistakenly recorded as 9. The modified logic corrects this problem.

OPERATION OF MODIFIED FLIP FLOP C

Before Q, R or S sees a character Notspace is low and sets flip flop C as it resets flip flops D, E, F and G. Thereafter, if sensor Q sees a top horizontal bar continuously as in characters 0, 2, 3, 5, 7, 8, and 9 input Q remains low so gate 60 output remains high, so flip flop C remains set indicating the presence of a top horizontal bar. If the character being read lacks a top horizontal bar, as in 1, 4 and 6 flip flop C is nevertheless set by Notspace before the character is read. When a right vertical bar sets flip flop F or G, making its complementary output low, gate 55 output becomes high, providing one high input to gate 60. If input Q is already high (as in ideal conditions) or becomes high after flip flop F or G is set (as it may in non-ideal conditions) both inputs to gate 60 are high, its output becomes low and resets flip flop C indicating the absence of a top horizontal bar.

The difference in effect between the logic of figure 6 and modified logic of FIG. 8 is this; in the FIG. 6 logic a top horizontal bar is considered present if sensor Q is dark at the instant that T or U first sees a right vertical bar; in the FIG. 8 logic the top horizontal bar is considered present only if sensor Q is dark throughout the time that sensors T and U see the right vertical bars.

Thus a narrow space between the top vertical bars of a 4 is more certain of being sensed.

SMALL CHARACTER REJECT

Some credit cards contain embossed characters such as letters or dates in line with the embossed numerals which this invention seeks to read, but in a type font which is substantially smaller in size. These characters cannot be read correctly but may produce erroneous outputs if the logic of FIG. 6 is used. Such characters are so small that they cannot be seen by both of the sensors Q and S, although depending on the characters location either one of these sensors and also R, T and U may detect the character. In the logic of FIG. 6 the resulting series of events may produce an erroneous character, either a 1, 4, or 7. Flip Flop H is added to discriminate against these small characters.

Flip flop H is reset by Notspace when Q, R and S all see light between characters. For all proper characters sensors Q and S see dark at the same time in some portion of the character as shown in FIG. 1. When this happens, QD and SD both become high so grade 61 output becomes low, setting flip flop H, whose output then provides a high input to Nand gate 63. When flip flops F or G or both are set gate 55 provides a second high input to gate 63, and when T and U both see light against at the end of the character inverter 54 provides the third high input. Gate 63 output becomes low providing the Strobe output, which is subsequently terminated when flip flops F, G and H are reset.

When a small character is sensed at least one of sensors Q and S remains high, so QD or SD remains low keeping gate 61 high. Therefore flip flop H remains reset and its output holds gate 63 output high and no Strobe results.

It will be apparent to those skilled in the art that variations and mofifications of the foregoing invention may be made within the spirit of the teachings disclosed herein. For example, one of the features of the foregoing invention is its independence of any knowledge of the speed at which scanning occurs. If the speed is known, or a substantially constant speed of scanning is provided, or a timing means is provided with the use of a variable speed, the requirement for horizontal displacement between the two sets of detectors may be eliminated. The purpose of the horizontal displacement between the two sets of detectors is to cause the events described previously to occur in a predetermined sequence for any given character. In other words, the output signals for the two sets of detectors occur at different times for the detecting of elemental components of a character located along any predetermined vertical line or slice of the character. If the speed is known, or a substantially constant speed is provided, or a timing means is provided for a variable speed scanning, the signals from the Q, R and S detectors could be delayed electronically by a time delay means which provides a time delay equal to the horizontal displacement between the two sets of detectors divided by the scanning speed. Therefore, with all of the detectors arranged in a single vertical line or plane, the signals would occur in the same sequence as if the horizontal displacement had been present. Furthermore, it will also be apparent to those skilled in the art that the T and U detectors described herein may follow the Q, R and S detectors with the beginning of a character being sensed by one of the Q, R or S detectors.

In view of the above, the present invention may be embodied in other specific forms without departing from the spirit or essential attributes thereof and, accordingly, reference should be made to the appended claims, rather than to the foregoing specification as indicating the scope of the invention.

What is claimed is:

1. A method for use in identifying characters of a font comprised of spatially oriented bars, and method comprising:

scanning horizontally across a character with at least five detectors each of which is positioned to scan a band of the character to be identified, said detectors being separable into a first and second group;

generating digital output signals in response to the presence or absence of bars of the character in the bands scanned by the detectors, each of said output signals having a first transition in levels when a bar of the character is present in the band scanned by a detector and the bar and the detector move into juxtaposition and a second transition in levels when the bar of the character and the detector move out of juxtaposition, said second transition in levels being opposite to said first transition in levels; and generating signals indicative of the bars of the character scanned in response to the digital output signals generated by the detectors and the sequence of the digital output signals generated by certain detectors relative to the output signals generated by other detectors, independently of any external timing signals.

2. A method for scanning characters of a font having combinations of top, middle and bottom horizontal bars, and top left and right and bottom left and right vertical bars, comprising the steps of:

scanning a character with a first and second set of detectors, said first set of detectors positioned to produce digital signals in response to movement of said top, middle and bottom horizoontal bars relative to said first set of detectors and said second set of detectors positioned to produce digital signals in response to movement of said top left and right and said bottom left and right vertical bars relative to said second set of detectors;

each of said digital signals having a first transition in levels when each of said detectors moves into juxtaposition with its respective horizontal or vertical bars and a second transition in levels when each of said detectors moves out of juxtaposition with its respective horizontal or vertical bars, said second transition in levels being opposite to said first transition in levels;

causing the signals produced by said first set of detectors for scanning said horizontal bars to occur after the signals produced by said second set of detectors for scanning said vertical bars in response to the detection of bars of a character located along a predetermined vertical line; and digitally identifying each of said bars in response to the signals produced by said first and second sets of detectors and the sequence of occurrence of certain of said signals relative to other of said signals independently of any external timing signals.

3. A method for use in identifying characters of a font comprised of elemental components by scanning the characters from left to right, comprising:

scanning the characters from left to right with a first and second set of detectors;

generating output signals from each detector in response to detecting an elemental component of a character in juxtaposition with the detector;

causing the output signals of the detectors of said first set of detectors to occur after the output signals of said second set of detectors for detecting elemental components of a character located along a predetermined vertical line, whereby said output signals from said first and second sets of detectors occur in a sequence in detecting elemental components of the character along said predetermined vertical line; and identifying each of said elemental components of said characters scanned in response to the output signals generated by said first and second sets of detectors and the sequence of occurrence of certain of said signals relative to other of said signals independently of any external timing signals.

4. A method in accordance with claim 3 including the steps of producing a strobe pulse after a predetermined sequential occurrence of certain of said signals relative to other of said signals to indicate that the elemental components so far indicated are sufficient to identify the character being scanned.

5. Apparatus for use in identifying characters comprised of spatially oriented bars, comprising:

means for scanning substantially horizontally across each character to be identified from left to right, said scanning means including at least five detector means separable into a first and second group, each of said detector means being positioned in said scanning means for scanning a band of the character to be identified and producing a digital signal output in response to the presence or absence of bars of the character to be identified in said band, said digital signal output having a first transition in levels when a bar of the character to be identified and the detector means move into juxtaposition and a second transition in levels when a bar of the character to be identified and the detector means move out of juxtaposition; and logic circuit means for receiving the digital signal output of each detector means of said scanning means, said logic circuit means being responsive to the digital signal outputs of said detector means and the sequence of said digital signal outputs of certain detector means relative to the digital signal outputs of other detector means for producing a plurality of output signals indicative of the bars of the character scanned independently of any external timing signals.

6. Apparatus for use in identifying characters comprised of elemental components by scanning the characters from left to right, comprising:

a scan head for scanning the characters from left to right, said scan head being provided with a first and second set of detectors, each set of detectors being provided with at least one detector for detecting elemental components of the character, each of said detectors generating an output signal in response to detecting an elemental component of the character, said signal having a first transition in levels if an elemental component of said character moves into juxtaposition with the detector and a second transition in levels if an elemental component of said character moves out of juxtaposition with the detector;

means for causing the output signals of the first set of detectors to occur after the output signals of the second set of detectors for detecting elemental components of the character located along a predetermined vertical line, whereby said first and second sets of detectors produce output signals in a sequence in detecting said elemental components along said predetermined vertical line; and means responsive to the signals produced by said first and second sets of detectors and the sequence of occurrence of certain of said signals relative to other of said signals for identifying each of said elemental components of said character scanned independently of any external timing signals.

7. Apparatus in accordance with claim 6 wherein said means for causing the output signals of said first set of detectors to occur after the output signals of said second set of detectors comprises a physical displacement between said first and second sets of detectors along the line of scanning of the character.

8. Apparatus in accordance with claim 6 wherein said means for causing the output signals of the first set of detectors to occur after output signals of the second set of detectors comprises an electrical signal delay means connected in series with the output of said first set of detectors.

9. Apparatus for use in identifying characters of a font having combinations of top, middle, and bottom horizontal bars, and top and bottom, left and right vertical bars, comprising:

a first set of at least three vertically aligned detectors establishing Q, R, and S channels, said detectors of said first set of detectors being displaced from each other a distance substantially equal to the distance between top, middle and bottom horizontal bars of the font, respectively;

a second set of at least two vertically aligned detectors establishing T and U channels, said detectors of said second set of detectors being horizontally displaced relative to said first set of detectors and located vertically between the detectors of said first set;

each detector producing a signal in respone to the passage of a character therepast, said signal having a first transition in levels when a bar of said character and the detector move into juxtaposition and a second transition in levels when a bar of said character and the detector move out of juxtaposition, said signals of said fitst set of detectors occurring after said signals of said second set of detectors when bars of a character located along a predetermined vertical line are scanned by said first and second sets of detectors; and logic means responsive to the signals produced by said first and second sets of detectors and the sequence of occurrence of certain of said signals relative to other of said signals for identifying each of said bars of the character scanned independently of any external timing signals.

10. Apparatus in accordance with claim 9 wherein said logic means includes a first pair of storage means for indicating the presence or absence of top and bottom left vertical bars, each of said storage means having a set and a reset condition; and means responsive to signals produced by said detectors for detecting the occurrence of a first transition in the signal produced in either or both of the T and U channels before the occurrence of a first transition in the signals produced in any of the Q, R and S channels, and for setting one of the first pair of storage means in response to the detection of a first transition produced in said T channel indicating that the character being scanned has a top left vertical bar, and for setting the other of the first pair of storage means in response to the detection of the first transition in the signal produced in said U channel indicating that the character being scanned has a bottom left vertical bar.

11. Apparatus in accordance with claim 10 wherein said logic means includes a second pair of storage means for indicating the presence or absence of top and bottom right vertical bars, each of said storage means having a set and a reset condition, and means responsive to the signals produced by said detectors for detecting the occurrence of a first transition in the signal produced in either or both of the T and U channels after the occurrence of a first transition in the signal produced in any of the Q, R, and S channels, and for setting one of the second pair of storage means in response to a first transition in the signal produced in the T channel indicating that the character being scanned has a top right vertical bar, and for setting the other of the second pair of storage means in response to the detection of a first transition in the signal produced in the U channel indicating that the character being scanned has a bottom right vertical bar.

12. Apparatus in accordance with claim 11 wherein said logic means includes a third set of three storage means for indicating the presence or absence of top, middle and bottom horizontal bars, each of said storage means having a set and a reset condition, and means responsive to the signals produced by said detectors for detecting the occurrence of consecutive first and second transitions in the signal produced in any of the Q, R and S channels and the occurrence of a first transition in the signal produced in either or both of the T and U channels between said consecutive first and second Q, R or S channel transitions, and for setting one of the storage means in the third set in response to the detection of said first transition in the Q channel indicating that the character being scanned has a top horizontal bar, for setting the second storage means of the third set in response to the detection of said first transition in the R channel indicating that the character being scanned has a middle horizontal bar, and for setting the third storage means of the third set in response to the detection of said first transition in the S channel indicating that the character being scanned has a bottom horizontal bar.

13. Apparatus in accordance with claim 12 wherein said logic means includes means for producing a strobe pulse when a second transition in the signal produced in either or both of the T and U channels occurs subsequent to the occurrence of a first transition in the same signal, said first transition in said T or U channel signal occurring after a first transition in the signal produced in any of the Q, R and S channels for indicating that the states of said storage means contains sufficient information to identify the bars of the character being scanned.

14. Apparatus in accordance with claim 13 wherein said logic means includes means for preventing the generation of said strobe pulse unless both the Q and S channels have produced signals each having transitions in order to discriminate against characters of a height less than a predetermined height for the characters being read.

15. Apparatus in accordance with claim 13 wherein said logic means includes means for discriminating against embossed characters which do not have open spaces between their vertical bars.

16. Apparatus in accordance with claim 13 wherein said logic means is insensitive to the width of the vertical bars.

17. Apparatus in accordance with claim 13 wherein said logic means is independent of external timing information and responds to a specified sequence of said first and second transitions in said detector channels without reference to the length of time between the occurrence of said first and second transitions.

18. Apparatus in accordance with claim 12 wherein said logic means includes means to produce a clear pulse when a second transition occurs in all the Q, R and S channel signals for indicating that the scanning of a character has been completed and for clearing said logic means in preparation for the scanning of the next character.

19. Apparatus for use in identifying characters of a font having combinations of top, middle and bottom horizontal bars, and top and bottom, left and right vertical bars, said apparatus comprising:

a first set of detectors including at least a first, a second and a third detector positioned to detect said top, middle and bottom horizontal bars respectively;

a second set of detectors including at least a fourth and a fifth detector positioned to detect said top vertical bars and said bottom vertical bars respectively, said fourth detector being positioned between said first and second detectors, and said fifth detector being positioned between said second and third detectors;

each detector producing a signal in response to relative movement of a character with respect to the detectors, said signal having a first transition in levels when a bar of said character and the detector move in juxtaposition, and a second transition in levels when a bar of said character and the detector move out of juxtaposition, said second transition in levels being opposite to said first transition in levels;

means for causing the signals produced by said first set of detectors for detecting said top, middle, and bottom horizontal bars to occur after the signals produced by said second set of detectors for detecting said top and bottom vertical bars in response to the detection of bars of a character located along a predetermined vertical line; and means responsive to the signals produced by said first and second sets of detectors and the sequence of occurrence of certain of said signals relative to others of said signals for producing output signals indicative of the bars of the character scanned independently of any external timing signals.

20. Apparatus in accordance with claim 19 wherein said means for causing the signals produced by said first set of detectors to occur after the signals produced by said second set of detectors comprises a physical displacement between said first and second sets of detectors along the line of relative movement between the character being scanned and the detectors.

21. Apparatus in accordance with claim 19 wherein said means for causing the signals produced by said first set of detectors to occur after the signals produced by said second set of detectors comprises a delay means connected in series with the output of at least one of said detectors of said first set of detectors for detecting said top, middle and bottom horizontal bars.

22. Apparatus in accordance with claim 19 including means for producing a strobe pulse after a predetermined sequential occurrence of certain of said signals relative to other of said signals to indicate that the bars so far indicated are sufficient to identify the character being scanned.

* * * * *